(12) United States Patent
Kirjavainen

(10) Patent No.: US 7,056,456 B2
(45) Date of Patent: Jun. 6, 2006

(54) EXTRUSION METHOD AND EXTRUDER

(75) Inventor: Kari Kirjavainen, Tampere (FI)

(73) Assignee: Conenor Oy, Espoo (FI)

( * ) Notice: Subject to any disclaimer, the term of this patent is extended or adjusted under 35 U.S.C. 154(b) by 131 days.

(21) Appl. No.: 10/363,313

(22) PCT Filed: Sep. 26, 2001

(86) PCT No.: PCT/FI01/00837

§ 371 (c)(1),
(2), (4) Date: Sep. 10, 2003

(87) PCT Pub. No.: WO02/26473

PCT Pub. Date: Apr. 4, 2002

(65) Prior Publication Data

US 2004/0026815 A1    Feb. 12, 2004

(30) Foreign Application Priority Data

Sep. 27, 2000    (FI) .................................. 20002125

(51) Int. Cl.
*B29C 47/00*    (2006.01)
*B01D 29/00*    (2006.01)

(52) U.S. Cl. ........................................ 264/39; 210/791
(58) Field of Classification Search ............ 264/209.1, 264/39; 425/199; 210/791, 793
See application file for complete search history.

(56) References Cited

U.S. PATENT DOCUMENTS 3,495,299 A * 2/1970 Chazal et al. ................ 425/197

FOREIGN PATENT DOCUMENTS

| | | |
|---|---|---|
| EP | 0 422 042 B1 | 1/1995 |
| FR | 2 729 099 | 7/1996 |
| JP | A 7-1552 | 1/1995 |
| JP | A 10-216418 | 8/1998 |
| WO | 00/29196 | 5/2000 |

* cited by examiner

*Primary Examiner*—Mark Eashoo
(74) *Attorney, Agent, or Firm*—Young & Thompson

(57) ABSTRACT

In an extrusion method and an extruder, an annular material flow is created by extruding material into an annular extrusion channel (6). The extruder has a tubular filtering unit (7) arranged to the annular extrusion channel (6), whereby the annular material flow flows through the tubular surface of the filtering unit (7).

5 Claims, 5 Drawing Sheets

EXTRUSION METHOD AND EXTRUDER

The invention relates to an extrusion method, in which method an annular material flow is created by extruding material into an annular extrusion channel.

The invention further relates to an extruder having means for extruding material and an annular extrusion channel, the means for extruding material being arranged to extrude the material into the annular extrusion channel so as to create an annular material flow in the extrusion channel.

In extrusion production, such as the manufacture of films and cables, it is often necessary to filter the plastic flow. Typically, the filter is located after an extruder before a press head and nozzles in a flow channel where the plastic flow is in a rod-like form. So as not to have to interrupt the flow during a filter change, a solution has been developed in which the filter has a filter tape that is fed substantially continuously in a transverse direction to the flow.

Extruders are also known that create an annular output flow, i.e. the output flow is created into an annular extrusion channel. EP patent 0 422 042, for instance, describes a conical extruder with which an annular output flow is created, whereby a tubular product can be formed without requiring a spider leg that causes weld lines in the product. If in this kind of solution, the plastic flow were to be filtered, the material would have to be made to flow in a rod-like form at some stage, which would remove some of the advantages provided by a conical extruder. Thus, filtering is not used in extruders that create an annular output flow.

It is an object of the present invention to provide a solution, in which in an extruder that creates an annular output flow, the material flow can be filtered without substantially weakening the properties of the final product.

The method of the invention is characterized in that in connection with an annular extrusion channel, there is a tubular filtering unit, and material is filtered by making it flow through the surface of the tubular filtering unit.

Further, the extruder of the invention is characterized in that the extruder has a tubular filtering unit that is arranged to an annular extrusion channel so that an annular material flow flows through the tubular surface of the filtering unit.

An essential idea of the invention is that an output flow is created into an annular extrusion channel in the extruder, and that the extruder has a tubular filtering unit arranged to the annular extrusion channel so that an annular material flow flows through the tubular surface of the filtering unit. The idea of one preferred embodiment is that the filtering unit has at least three layers, in which case the outer and inner layers of the filtering unit are substantially stationary and have between them a layer that can be moved. The outer and inner layers have holes and the material is arranged to flow sideways in the intermediate layer, whereby it is filtered and the filtered material remains in the layer in question on the side of the holes of the layer first in the flow direction of the material. When the filtering unit needs to be cleaned, the intermediate layer is moved in such a manner that the filtered material settles at the holes of the layer last in the flow direction of the material and due to the material flow, the filtered material particles flow out of the extruder. For a time, unsuitable material then exits the extruder, but the filtering unit is substantially clean and can efficiently filter new material. Thus, when cleaning the filtering unit, its inlet part is changed into its outlet part and vice versa. The idea of one preferred embodiment is that the extruder has at least two feed gaps within each other and shaped like a convergent cone, and at the end of a rotor located between the feed gaps, a return channel is formed extending a distance backwards from the end of the rotor. Both feed gaps allow a small amount of material to flow into the return channel, whereby an uncontrolled mixing of materials in different feed gaps or their burning to the filtering unit or to the end of the rotor is prevented.

The invention provides the advantage that the extruder provides an annular material flow that can be kept annular even though the material flow is filtered. The filtering surface area formed by the tubular filtering unit is very large, and the resistance caused by the filtering unit remains fairly small even though filtering efficiency is good. In a three-layer filtering unit, by changing the inlet part of the filtering unit to be the outlet part and vice versa, the filtering unit can be cleaned, i.e. the extruder can be a continuous one, because the blocking of the filtering part or the need for maintenance do not cause a break in the operation of the extruder. Arranging a return channel to the end part of the rotor provides a structure that makes it possible to extrude two different plastic materials in different feed gaps of a conical extruder and to filter them without an uncontrolled mixing of the materials or without their burning to the end of the extruder.

The invention is described in greater detail in the attached drawings, in which

Figure 3A:
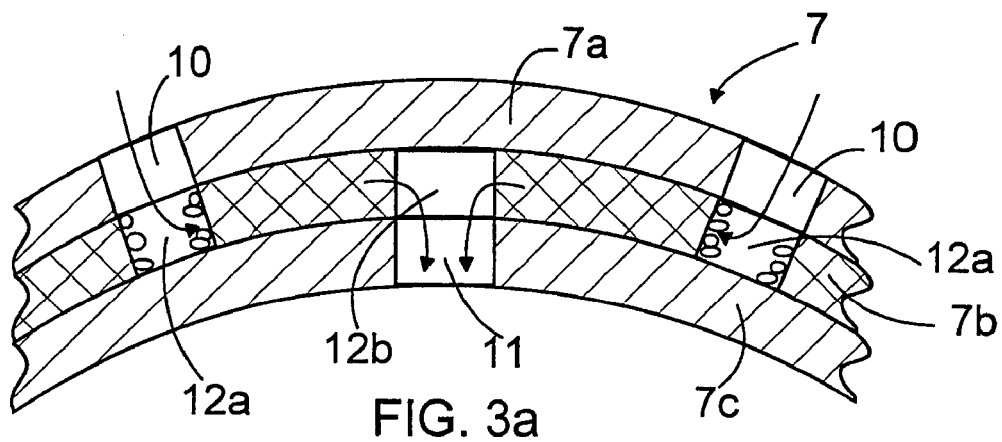
Figure 3B:
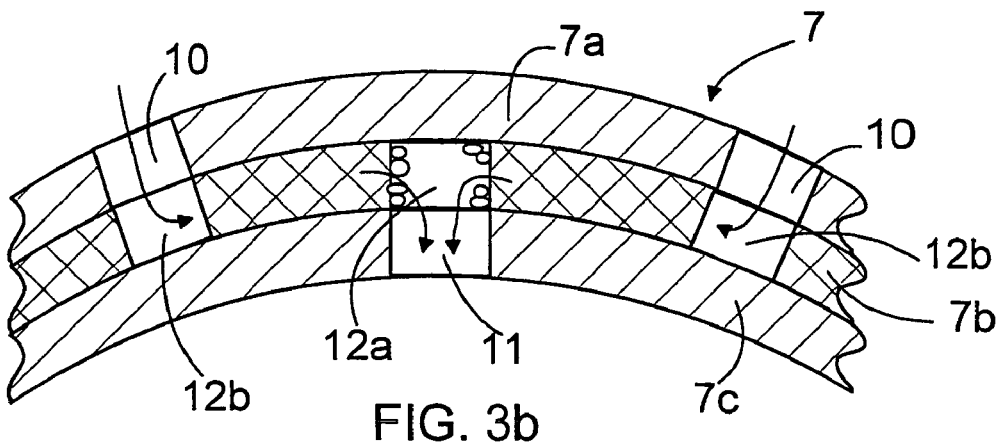
Figure 4:
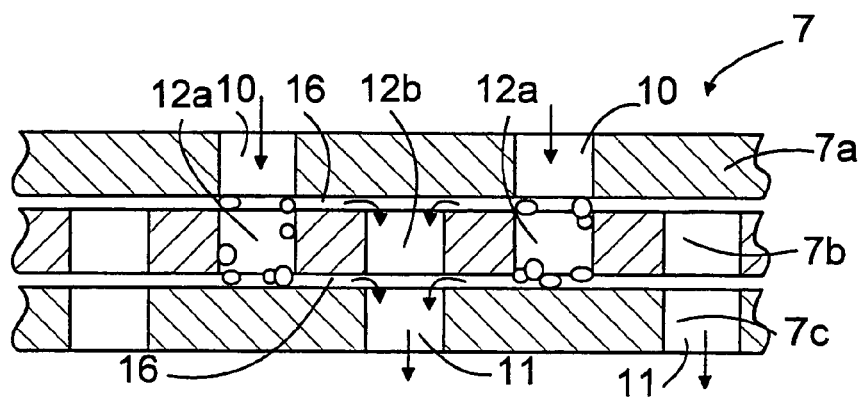
Figure 5:
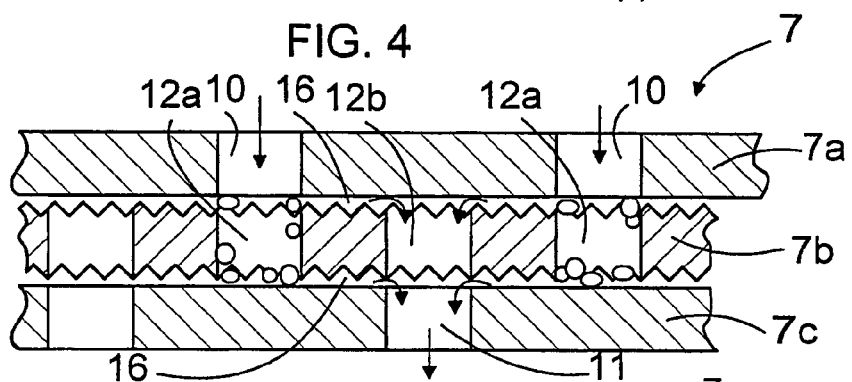
Figure 6:
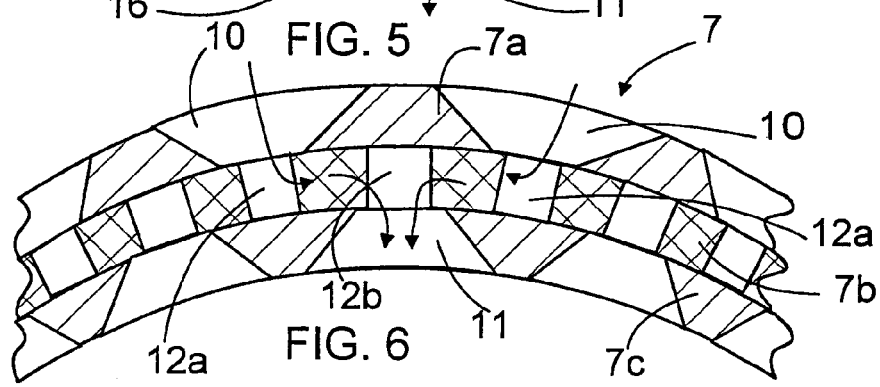
Figure 7:
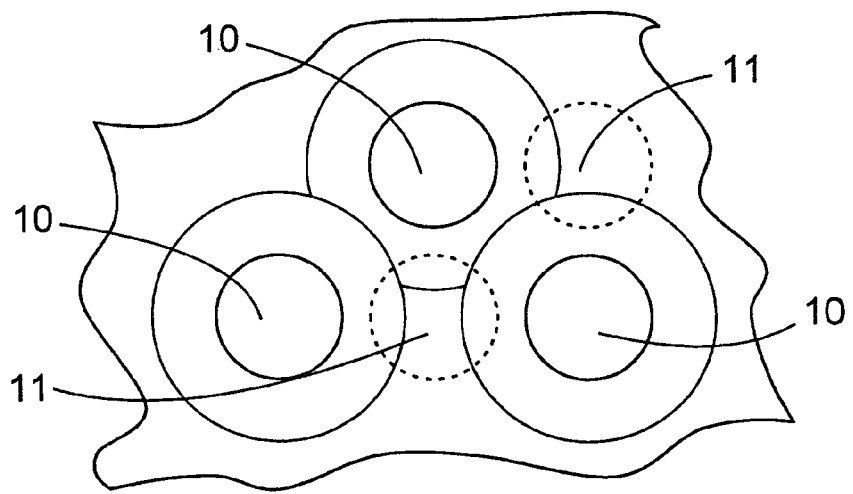
Figure 8:
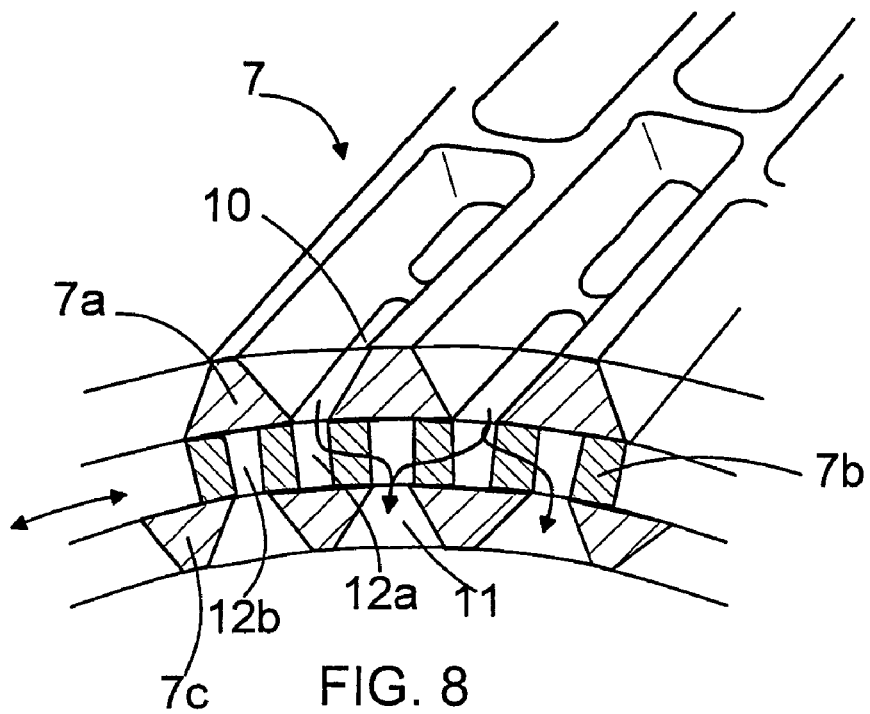
Figure 9:
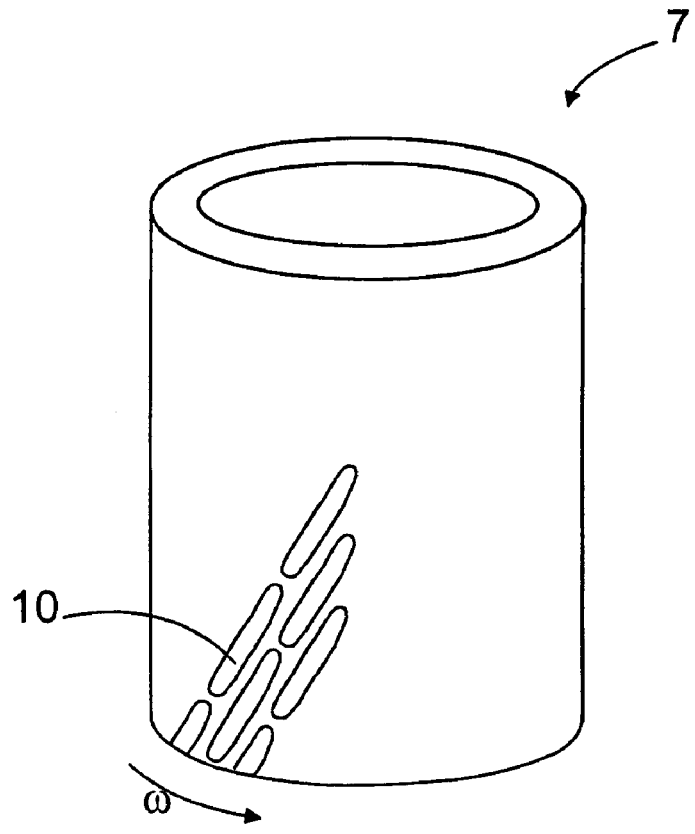
Figure 10:
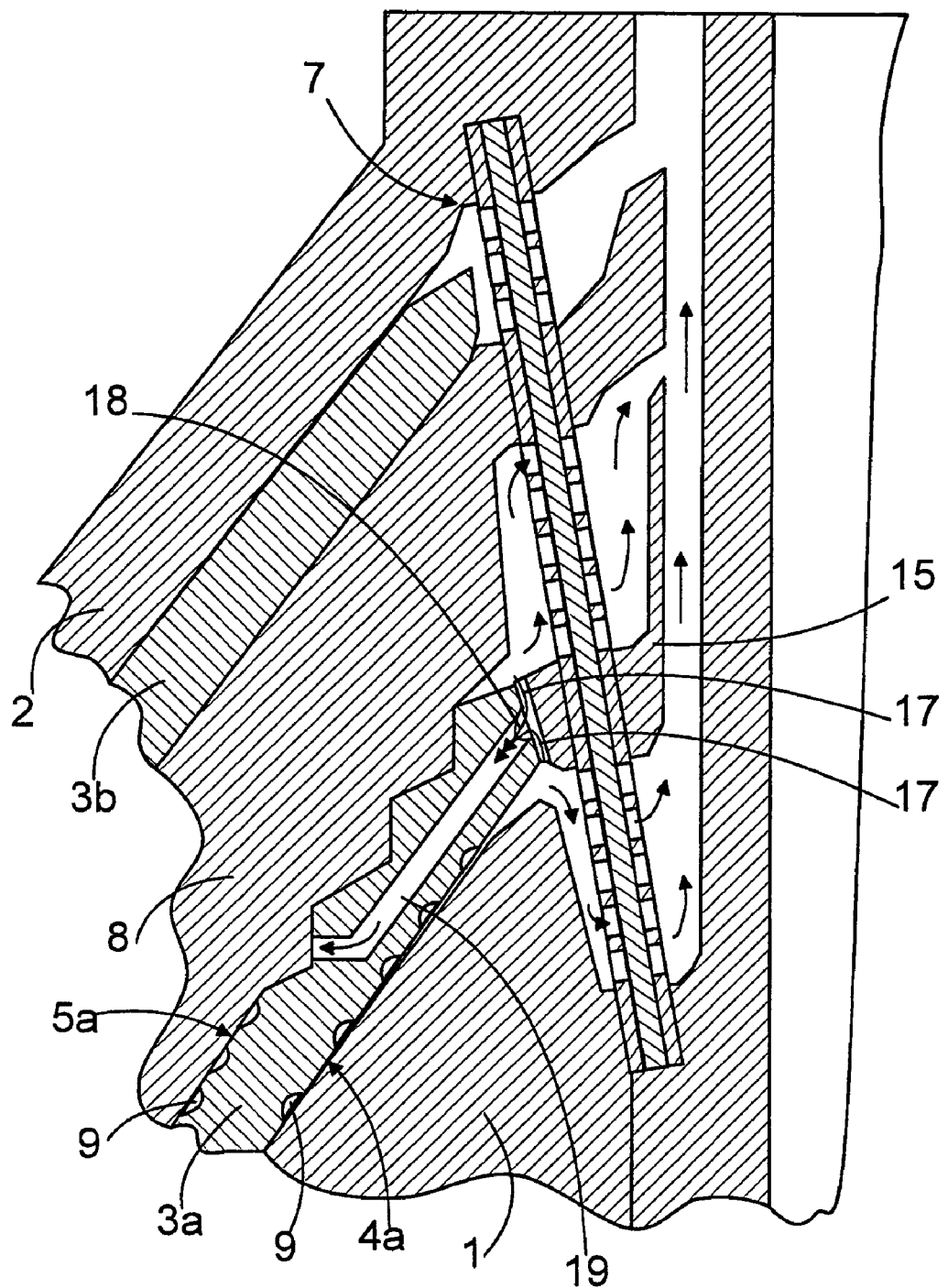

FIGS. 3a and 3b are schematic cross-sectional views of a filtering unit in the axial direction, FIG. 4 is a schematic cross-sectional view of a second filtering unit in the axial direction, FIG. 5 is a schematic cross-sectional view of a third filtering unit in the axial direction, FIG. 6 is a schematic cross-sectional view of a fourth filtering unit in the axial direction, FIG. 7 is a schematic side view of the placement of holes in the filtering unit shown in FIG. 6, FIG. 8 is a schematic cross-sectional view of a fifth filtering unit as seen diagonally from the top, FIG. 9 shows a schematic representation of a sixth filtering unit, and FIG. 10 shows a schematic cross-sectional side view of the end part of a second extruder.

Figure 1:
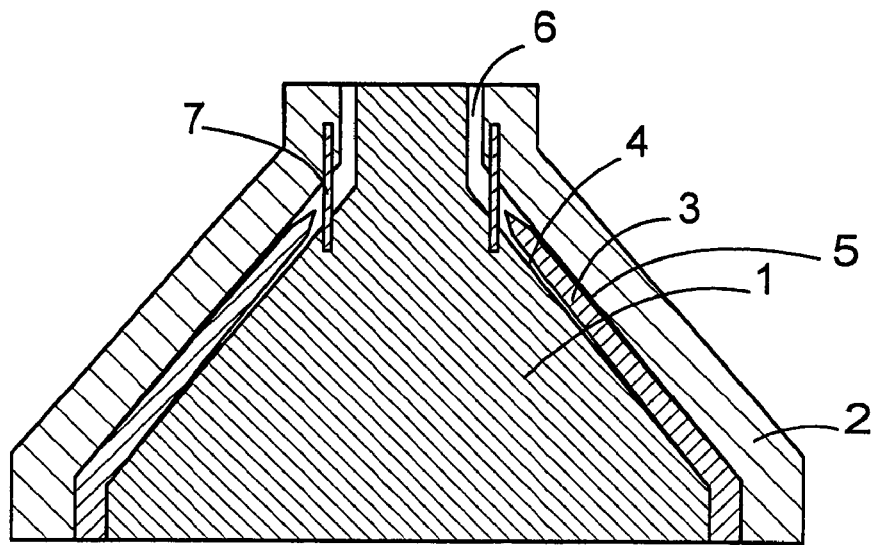
FIG. 1 is a schematic cross-sectional side view of an extruder.

FIG. 1 shows an extruder having a conical inner stator 1 and a conical outer stator 2. A rotatable rotor 3 is arranged between the stators 1 and 2. An inner conical feed gap 4 forms between the inner stator 1 and the rotor 3 and an outer conical feed gap 5 is between the outer stator 2 and the rotor 3. Either the rotor 3 or the stators 1 and 2 or both have helical grooves, whereby when the rotor 3 is rotated, material flows from the feed gaps 4 and 5 into an annular extrusion channel 6. For clarity's sake, FIG. 1 does not show the grooves in the rotor and/or stators, or a rotating apparatus of the rotor or feeding means for feeding material to be extruded into the feed gaps 4 and 5, because said means and other corresponding details related to an extruder are obvious to a person skilled in the art and need, therefore, not be explained in detail herein. The material to be extruded is typically plastic, but can also be some other extrudable material. The extruder can be used for instance to manufacture a pipe, film, cable sheath or some other corresponding tubular product.

The extruder further has a tubular filtering unit 7 that is arranged in the extruder in such a manner that an annular material flow flows in from outside and is filtered and remains annular. The tubular filtering unit 7 is then preferably cylindrical or in the shape of a cone expanding in the flow direction of the material. The tubular filtering unit 7 can also be arranged in the extruder in such a manner that the annular material flow flows through it from inside to outside, in which case the tubular filtering unit 7 is most preferably in the shape of a cone converging in the direction of flow.

Figure 2:
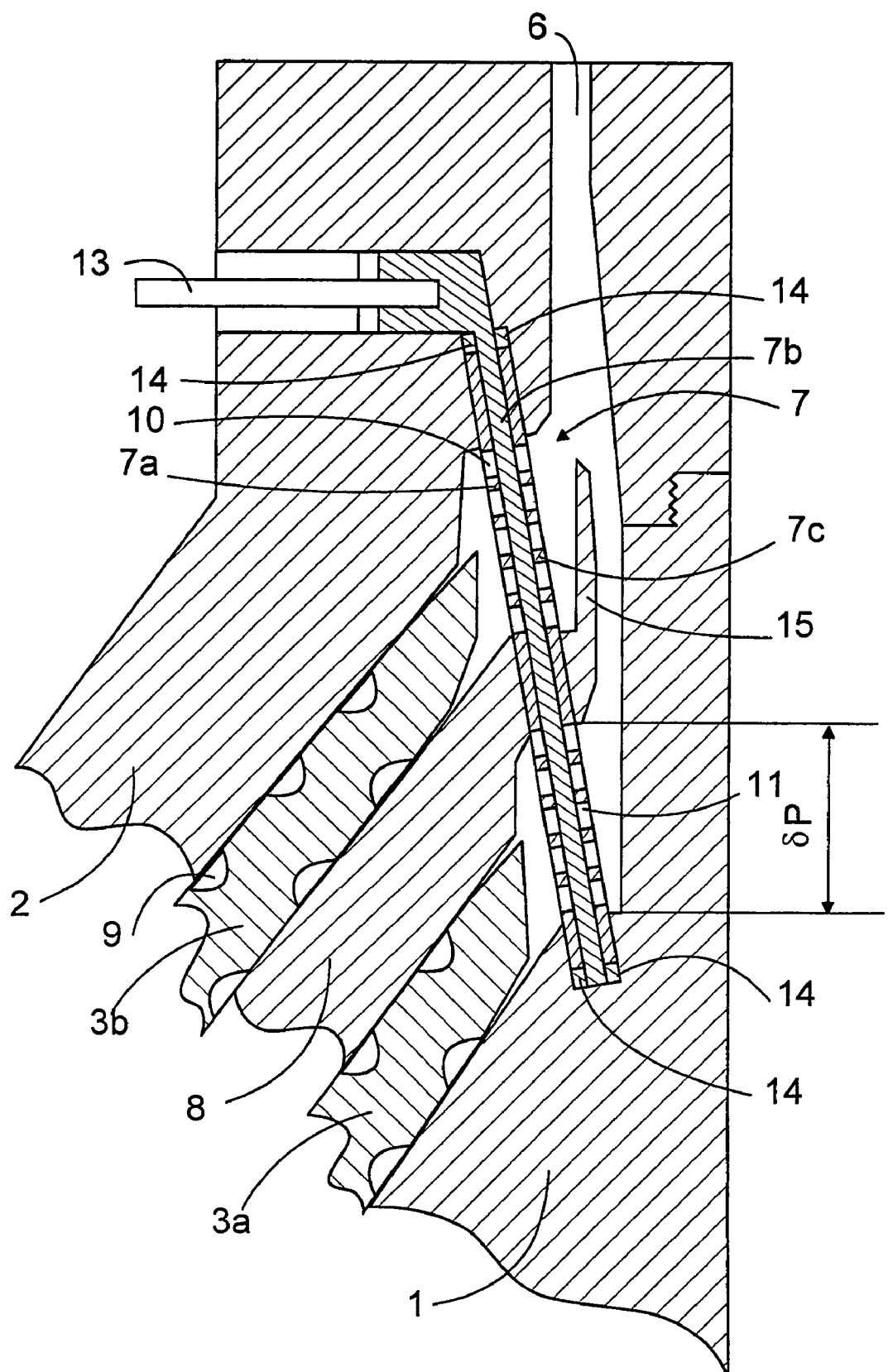
FIG. 2 is a schematic cross-sectional side view of the end part of an extruder.

FIG. 2 shows a solution in which the extruder has an intermediate stator 8 between an inner stator 1 and outer stator 2. Between the inner stator 1 and the intermediate stator 8, there is an inner rotor 3a, and between the intermediate stator 8 and the outer stator 2, there is an outer rotor 3b. The rotors 3a and 3b have helical grooves 9. In addition to or instead of the grooves in the rotors 3a and 3b, the stators 1, 2 and 8 may also have corresponding grooves.

The tubular filtering unit 7 has three layers. The outermost layer is an outer perforated layer 7a and the innermost layer is an inner perforated layer 7c. Between them, there is a filtering layer 7b. The structure and operation of the filter 7 is described in more detail in FIGS. 3a and 3b. The outer perforated layer 7b has inlet openings 10 and the inner perforated layer 7c has outlet openings 11. The inlet openings 10 and the outlet openings 11 are arranged at different points in such a manner that in the filtering layer 7b, material has to flow sideways as shown by the arrows in FIGS. 3a and 3b. The fact that the material flows sideways in the filtering layer 7b means that the material can flow in the direction of the cylindrical or conical surface of the filtering unit 7. The material can thus flow in the circumferential direction or in the axial direction or in any direction between these two. The filtering layer 7b has first openings 12a that in the case of FIG. 3a are located at the inlet openings 10, and second openings 12b that in the embodiment of FIG. 3a are arranged at the outlet openings 11. Thus, the material flows first into the inlet opening 10 of the outer perforated layer 7a and from there to the first opening 12a of the filtering layer 7b. After this, the material to be extruded flows through the filtering material of the filtering layer 7b which filtering material is made such that it allows particles smaller than an certain size to pass, i.e. main part of the material to be extruded can flow through the filtering material, but impurities and too large particles remain in the first opening 12a. After flowing through the filtering material, the material enters the second opening 12b of the filtering layer 7b and flows on through the outlet opening 11. The filtering material of the filtering layer can be sintered metal powder, for instance.

At the stage when impurities and/or large particles have accumulated in the first opening 12a of the filtering layer 7b to the extent that they begin to hamper the material flow, the filtering layer 7b is shifted in such a manner that the first openings 12a coincide with the outlet openings 11 and the second openings 12b coincide with the inlet openings 10 as shown in FIG. 3b. The material flow then pushes the impurities and/or too large particles through the outlet opening 11 into the extrusion channel 6 and consequently, the filtering unit becomes clean. Due to this so-called phase shift, the flow direction in the filtering layer changes, but because of the structure of the filtering unit, the extruder can operate continuously. Naturally, for a time after the shift, the material exiting the extruder contains impurities and/or too large particles, i.e. the product is probably unsuitable. This cleaning action can, however, be done for instance at the time of a roll change or during some other suitable time in production when unsuitable material can be led to rejects.

As stated above, the operation of the extruder can be kept continuous and good-quality material obtained quite quickly. Moving, i.e. rotating, the filtering layer 7b can be done by a rotating apparatus 13. The rotating apparatus 13 can, for instance, be a cogwheel, screw or some other means suitable for the purpose. The distance between the first openings 12a and the second openings 12b and, on the other hand, the distance between the inlet openings 10 and the distance between the outlet openings 11 must naturally be made suitable so that all openings coincide in a suitable manner both in the situation shown in FIG. 3a and in the situation shown in FIG. 3b. For cleaning the filtering unit, the filtering layer 7b can moved onward, i.e. rotated, each time, or in consecutive situations, the filtering layer 7b is moved into different directions, in which case the filtering layer is only moved back and forth and not rotated around. When the filtering layer 7b has been shifted and impurities and/or large particles have detached from the filter and exited the extruder, normal production can be continued immediately, which means that the direction of material flow in the filtering layer 7b changes each time after a cleaning operation. Another alternative is to move the filtering layer 7b back to its original place after the cleaning operation, in which case in normal production, the material always flows in the same direction in the filtering layer 7b. Turning the material flow only for cleaning ensures that particles weakening the properties of the final product cannot by accident enter the final product during normal production.

When the filtering unit 7 is substantially cylindrical, the filtering layer 7b can be moved in the circumferential direction or in the axial direction for the purpose of cleaning. By making the openings 10, 11, 12a and 12b coincide suitably, the filtering layer 7b can be moved in any direction between the circumferential and axial for the purpose of cleaning. The filtering layer 7b can thus be made to move along an oblique or helical line, for instance.

Clearance adjustment rings 14 have been arranged to the forward and tail ends of the outer perforated layer 7a and the inner perforated layer 7c. By adjusting the size of the clearance adjustment rings, it is possible to easily alter the location of the filtering unit 7 in the axial direction, and since the filtering unit 7 is in the shape of an expanding cone, the clearance between the filtering unit 7 and the extruder can be adjusted at the same time. The clearance between the outer perforated layer 7a and the filtering layer 7b and, correspondingly, the clearance between the inner perforated layer 7c and the filtering layer 7b can be adjusted by altering the location of the outer perforated layer 7a and the inner perforated layer 7c in the axial direction by means of the clearance adjustment rings 14. A corresponding clearance adjustment can also be done when the tubular filtering unit 7 is in the shape of a convergent cone. Further, when the filtering unit 7 is conical, it is easier to match, assemble and disassemble its different layers than those of a cylindrical filtering unit.

For replacing the filtering unit 7, the tail end 2a of the outer stator 2 can be detached from the outer stator and correspondingly, the tail end 1a of the inner stator 1 can be detached from the inner stator. Most preferably, the filtering unit 7 is made such that it can in its entirety be replaced in one piece. The replacing of the filtering unit can then be done quickly, because the new filtering unit can be assembled and cleaned to wait for replacement. A guide piece 15 for guiding the material flow in the extrusion channel 6 can be fixedly connected to the inner perforated layer 7c, in which case the guide piece 15 is replaced together with the filtering unit.

A pressure drop occurs in the axial direction in the filtering unit 7; this is marked $\delta P$ in FIG. 2. In FIG. 2, the pressure is then higher in the lower parts than in the higher parts. Because of the pressure drop $\delta P$ in the filtering unit 7, there is an upward material flow inside the filtering material in the axial direction in FIG. 2 that prevents the material from burning to the end of the extrusion apparatus.

FIGS. 4 and 5 show an alternative filtering unit structure. In FIGS. 4 and 5, the layers of the filtering unit 7 are shown horizontal, even though in reality the layers naturally are curved because the filtering unit 7 is tubular. In the embodiments of FIGS. 4 and 5, the filtering layer 7b is made of a solid material that does not allow the material being extruded to pass through it. The filtering layer 7b can be solid metal, for instance. The filtering is in this case done in such a manner that the clearances 16 between the outer perforated layer 7a and the filtering layer 7b and between the inner perforated layer 7c and the filtering layer 7b are arranged such that the material being extruded can flow through the clearances 16, but impurities and/or too large, particles remain close to the inlet openings until the filtering layer 7b is shifted for the purpose of cleaning the filtering unit as described above. The size of the clearance 16 is naturally selected according to the desired filtering capacity. The size of the clearance 16 can be approximately 1 mm, for instance, when extruding a material containing reprocessed plastic. The solution of FIG. 5 corresponds quite a lot to that of FIG. 4, but in the solution of FIG. 5, the filtering layer 7b has an uneven surface. Grooves, for instance, can be made by a lathe on the filtering layer 7b. Due to the uneven surface, the filtering surface area can be increased as compared with the solution in FIG. 4. If necessary, the surfaces of the outer perforated layer 7a and the inner perforated layer 7c can also be made uneven.

FIG. 6 shows a solution in which the inlet openings 10 of the outer perforated layer 7a are made in the shape of a convergent cone and the outlet openings 11 of the inner perforated layer 7c are made in the shape of an expanding cone. The inlet openings 10 in the shape of a convergent cone guide the material fluently into the openings of the filtering layer 7b. The outlet openings 11 in the shape of an expanding cone make it possible for the material to flow fluently on from the outlet openings 11. The solution of FIG. 6 makes the flow resistance of the filtering unit very small and there are no blind spots in the structure of the filtering unit where the material to be extruded could accumulate.

FIG. 7 is a schematic side view illustrating the staggering of the inlet openings 10 and the outlet openings 11. By arranging for instance the inlet openings 10 as shown in FIG. 7 in such a manner that the inlet openings above the horizontally adjacent inlet openings 10 are in the middle of the lower openings, several holes can be arranged in the filtering unit 7 and consequently, the flow resistance of the filtering unit can be kept quite low.

FIG. 8 shows an embodiment in which the openings 10, 11, 12a and 12b are elongated. In addition, the inlet openings 10 are convergent and the outlet openings 11 are expanding. Such a structure also ensures efficiently that the material to be extruded does not stick to the filtering unit 7.

FIG. 9 shows a cylindrical filtering unit 7 in which the openings 10, 12a, 12b and 11 are arranged in an oblique position with respect to the axial direction. For clarity's sake, FIG. 9 only shows a part of the openings 10, even though the filtering unit 7 naturally has openings 10 substantially on the entire surface of the filtering unit 7. The openings 10 are arranged obliquely in the same direction with respect to the rotation direction ω of the extruder rotors 3. The material flow then runs through the filtering unit 7 as efficiently as possible, i.e. the pressure loss caused by the filtering unit 7 in the material flow is as small as possible.

FIG. 10 shows a solution for making multi-layer products. The solution in question can, for instance, make a three-layer product in such a manner that by means of the outer rotor 3b the material is extruded to form the outermost layer of the product. The material to form the innermost layer of the product is extruded in the inner feed gap 4a of the inner rotor between the inner rotor 3a and the inner stator 1. The outer feed gap 5a of the inner rotor between the inner rotor 3a and the intermediate stator 8 can extrude adhesion plastic, for instance, for attaching the outermost and innermost layers of the final product to each other. There is a clearance 17 between the inner rotor 3a and the outer perforated layer 7a of the filtering unit 7. Further, there is a ring channel 18 at the tail end of the inner rotor 3a. Material flows from both the inner feed gap 4a and the outer feed gap 5a through the clearance 17 to the ring channel 18. One or more return channels 19 lead from the ring channel 18 to the outer feed gap 5a at a distance from the inner rotor 3a tip. Owing to the clearance 17, the end of the inner rotor 3a does not chafe the filtering unit 7. Owing to the clearance 17, the ring channel 18, and the return channel 19, a small amount of the material fed through the inner feed gap 4a and a small amount of the material fed through the outer feed gap 5a are allowed to flow between the rotor 3a and the filtering unit 7 to the return channel 19 and the materials do not burn to the end of the rotor or mix in an uncontrolled manner with each other, but said small amounts flow to the outer feed gap 5a at a distance from the end of the rotor 3a.

If the material to be extruded through the inner feed gap 4a did mix in an uncontrolled manner with the adhesion plastic, the adhesion plastic would not function, i.e. the outermost and the innermost layer would not attach to each other sufficiently well. Because the materials flow to a distance from the tip of the rotor 3a, said small material flow can be mixed with the adhesion plastic and the adhesion properties of the adhesion plastic will not weaken substantially. Most preferably, the return channel 19 leads according to FIG. 10 to the outer feed gap 5a, through which adhesion plastic is fed, because the consumption of adhesion plastic does not then increase, but instead decreases as compared with a situation in which said return channel does not exist. If the return channel led to the inner feed gap 4a, more adhesion material would be consumed as compared with the above-mentioned situation. At least the end part of the outer feed gap 5a is preferably made such that the surface between the rotor and stator is wave-formed, most preferably saw-tooth-waved, i.e. stepped. The grooves 9 are then made such that their depth varies in such a manner that from the rotor groove the material moves substantially in its entirety into the stator groove and vice versa, and the interface between the rotor and stator cuts the material flow. This type of a structure forms a powerful mixer producing positive pressure. To make back flow possible, pressure P1 at the end of the rotor 3a must be higher than pressure P2 in the end part of the return channel at a distance from the end part of the rotor 3a.

The drawings and the related description are only intended to illustrate the idea of the invention. The invention may vary in detail within the scope of the claims. Thus an annular output flow can also be created by other than conical extruders. The annular output flow can thus for instance be created by an extruder in which a material feed apparatus feeds material through a radial pump unit made up of conical cogwheels, as described in WO publication 00/23251, for instance.

The invention claimed is:

1. An extrusion method in which method an annular material flow is created by extruding material into an annular extrusion channel comprising a tubular filtering unit, whereby material is filtered by making it flow through a surface of the tubular filtering unit, the filtering unit having at least an outer layer, an inner layer and a filtering layer, the outer and inner layers of the filtering unit being substantially stationary and having between them the filtering layer that can be moved, the outer and inner layers having openings and the material is arranged to flow sideways in the filtering layer, whereby it is filtered and the filtered material remains in the filtering layer on the side of the openings of the layer first in the flow direction of the material, wherein the filtering unit is cleaned by moving the filtering layer in such a manner that the filtered material settles at the openings of the layer last in the flow direction of the material and due to the material flow, the filtered material particles flow out of the extruder.

2. A method as claimed in claim 1, wherein the annular material flow is created by an extruder having at least one conical stator and at least one conical rotor.

3. A method as claimed in claim 2, wherein the extruder has at least two stators, and there is a conical feed gap on both sides of the rotor and there is at least one return channel at the end of the rotor, whereby material flowing through the feed gaps flows through the return channel from the end of the rotor backwards to a distance from the end of the rotor.

4. An extrusion method, comprising the steps of:

creating an annular material flow by extruding material into an annular extrusion channel comprising a tubular filtering unit;

filtering the material by making the material flow through a surface of the tubular filtering unit, the filtering unit having at least a substantially stationary outer layer, a substantially stationary inner layer and a movable filtering layer located between the outer layer and the inner layer, the outer and inner layers having openings;

flowing the material sideways in the filtering layer to filter the material with the filtered-out material remaining in the filtering layer on a side of the openings of the layer first in the flow direction of the material; and cleaning the filtering unit by phase-shift moving the filtering layer in such a manner that the flow direction in the filtering layer and the filtered-out material settles at the openings of the layer last in the flow direction of the material and, due to the material flow during cleaning, so that the filtered-out material particles flow out of the extruder.

5. An extrusion method, comprising the steps of:

creating an annular material flow by extruding material into an annular extrusion channel comprising a three-layer tubular filtering unit having a stationary outer perforated layer, a stationary inner perforated layer and a movable filtering layer located intermediate the inner and outer layers, the outer and inner layers having material flow openings;

filtering the material by flowing the material in through an outside surface of the tubular filtering unit with the material flowing sideways in the filtering layer and the filtered-out material remaining in the filtering layer on the side of the openings of the layer first in the flow direction of the material; and cleaning the filtering unit by phase-shift moving the filtering layer in such a manner that the flow direction in the filtering layer changes and filtered-out material settles at the openings of the layer last in the flow direction of the material and due to the material flow, the filtered-out material particles flow out of the extruder.

* * * * *